United States Patent [19]
Seshadri

[11] Patent Number: 5,479,448
[45] Date of Patent: Dec. 26, 1995

[54] METHOD AND APPARATUS FOR PROVIDING ANTENNA DIVERSITY

[75] Inventor: Nambirajan Seshadri, Chatham, N.J.

[73] Assignee: AT&T Corp., Murray Hill, N.J.

[21] Appl. No.: 860,830

[22] Filed: Mar. 31, 1992

[51] Int. Cl.$^6$ .............................. H04B 7/02; H04B 7/06
[52] U.S. Cl. ..................... 375/267; 375/260; 375/347; 455/61
[58] Field of Search ................... 375/38, 40, 67, 375/100; 371/68.1, 68.2; 343/729, 893; 455/60, 61, 66, 33.3, 59, 63; 370/29, 18, 50

[56] References Cited

U.S. PATENT DOCUMENTS

| | | | |
|---|---|---|---|
| 3,267,380 | 4/1966 | Adams | 455/52.2 |
| 3,348,150 | 10/1967 | Atal et al. | 405/52.3 |
| 3,662,268 | 5/1972 | Gans et al. | 455/52.1 |
| 3,717,814 | 2/1973 | Gans | 455/52.1 |
| 4,057,758 | 11/1977 | Hattori et al. | 375/40 |
| 4,280,222 | 7/1981 | Flower | 375/38 |
| 4,383,332 | 5/1983 | Glance et al. | 455/33.3 |
| 4,490,830 | 12/1984 | Kai et al. | 375/40 |
| 4,513,412 | 4/1985 | Cox | 370/29 |
| 4,881,241 | 11/1989 | Pommier et al. | 455/59 |
| 5,134,633 | 7/1992 | Werner | 375/100 |
| 5,170,413 | 12/1992 | Hen et al. | 370/69.1 |
| 5,203,018 | 4/1993 | Hirose | 375/40 |
| 5,305,353 | 4/1994 | Weeraekody | 375/38 |

OTHER PUBLICATIONS

P. S. Henry and B. S. Glance "A New Approach to High-Capacity Digital Mobile Radio", The Bell System Technical Journal, vol. 60, No. 8, 1891–1904 (1981).

G. Ungerboeck "Channel Coding with Multilevel/Phade Signals", IEEE Transactions on Information Theory, vol. IT-28, No. 1, 55–67 (Jan. 1982).

S. G. Wilson and Y. S. Leung "Trellis–Coded Phase Modulation on Rayleigh Channels", IEEE, 0739–0743 (1987).

E. Biglieri et al. "Introduction to Trellis–Coded Modulation with Applications", Macmillan Publishing Company (1991).

W. C. Jakes, Jr. "Microwave Mobile Communications" John Wiley & Sons (1974).

S. Nanda and O-C. Yue "Variable Partition Duplexing for Wireless Communications", Globecom '91, 1147–1153 (1991).

Shu Lin et al. "Error Control Coding", Chapter 1 and 3 1983.

*Primary Examiner*—Stephen Chin
*Assistant Examiner*—T. Ghebretinsae
*Attorney, Agent, or Firm*—Thomas A. Restaino

[57] ABSTRACT

A method and apparatus providing antenna diversity is disclosed. A set of bits of a digital signal are used to generate a codeword of N symbols. Codewords are provided according to a channel code having a minimum Hamming distance, $d_{min}$, where $2 \leq d_m \leq N$. N signals representing N symbols of a codeword are transmitted with N different antennas. The N transmitted signals are received and isolated. A sequence of N received symbols is formed from the isolated symbols and compared with one or more valid codewords to associate the sequence with a codeword. A set of bits based on a codeword associated with the received sequence is generated.

13 Claims, 4 Drawing Sheets

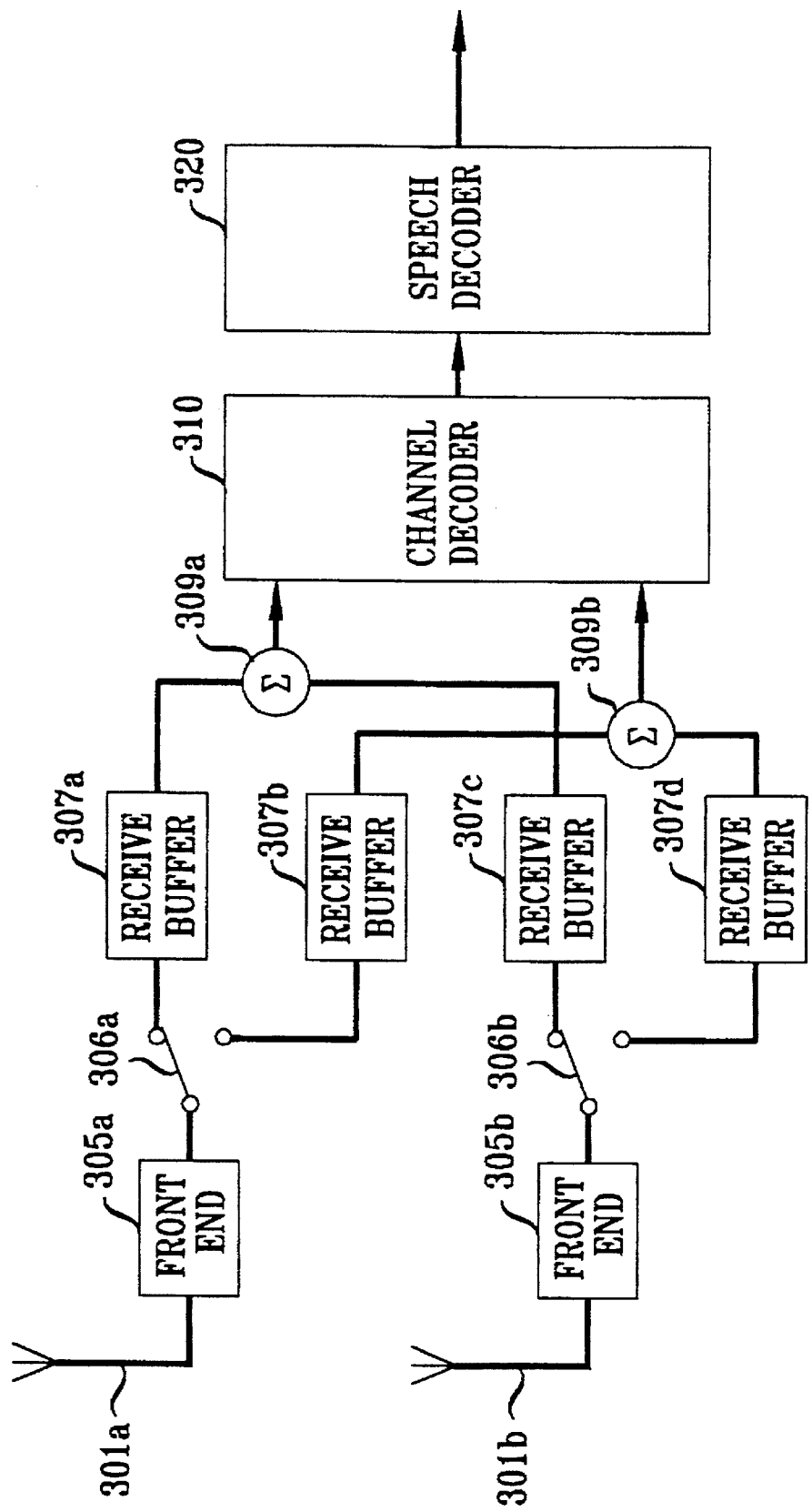

5,479,448

METHOD AND APPARATUS FOR PROVIDING ANTENNA DIVERSITY

FIELD OF THE INVENTION

The present invention relates generally to the field of communications systems, and particularly to the field of radio communications, such as cellular radio.

BACKGROUND OF THE INVENTION

Antenna diversity is a technique used in antenna-based communication systems, such as, e.g., cellular radio, to reduce the effects of multi-path distortion fading. Antenna diversity may be obtained by providing a receiver with two or more (i.e., $N \geq 2$) antennas. These N antennas imply N channels which suffer fading in a statistically independent manner. Thus, when one channel is fading—that is, suffering amplitude loss due to the destructive effects of multi-path interference, another of these channels is unlikely to be suffering from fading simultaneously. By virtue of the redundancy provided by these independent channels, a receiver can often avoid the detrimental effects of fading.

Receivers of broadcast transmissions, of course, require at least one antenna to receive a broadcast signal. Each additional antenna used to facilitate the avoidance of fading adds to receiver cost and complexity. Naturally, it is desirable to avoid the effects of fading using as few antennas as possible.

In time division duplex (TDD) radio transmission systems, mobile radio units equipped with a single antenna can obtain the benefits of antenna diversity if the associated base station employs multiple antennas when transmitting information. Antenna diversity is possible in TDD systems using the principle of adaptive retransmission so long as system channel response characteristics (e.g., amplitude and fade) in both transmission directions are essentially the same. See W. C. Jakes, Jr., Ed., Microwave Mobile Communications (1974).

Despite the fact that TDD-based systems can provide antenna diversity using a single antenna at the receiver, the desirability of such systems for mobile communication, such as cellular radio, is offset by a number of factors. First, TDD-based systems require precise clock synchronization across base stations. Without such clock synchronization, a mobile-to-base transmission in one cell can be substantially interfered with by a base-to-mobile transmission in a neighboring cell using the same frequency. Although suitable clock synchronization may be provided through use of the global positioning system (GPS), GPS-based timing adds significantly to base-station (and thus user) cost.

Second, for TDD systems with slow signaling rates (such as those specified by IS-54, a narrow-band TDMA digital cellular standard), the base-to-mobile and mobile-to-base channels may be different thereby undermining the benefits of adaptive retransmission. Although the problem of slow signaling rate can be addressed through the use of shorter time slots, this can result in significant loss of capacity if fixed signaling overhead is required for each slot.

Third, and perhaps most importantly, TDD communication systems are incompatible with existing cellular systems, which employ frequency division duplex (FDD) communication.

FDD-based communication systems do not present the timing and compatibility difficulties discussed above with reference to TDD systems. However, FDD-based systems have no capability to perform adaptive retransmission since mobile-to-base and base-to-mobile transmission occurs in two independently fading frequency bands. A diversity benefit in FDD-based systems using a single receiving antenna has been provided in the past by the repeated transmission of a set of information symbols over one channel at two distinct intervals in time. Because only one channel is actually in use, diversity is provided by separating the two transmissions far enough in time so that the fading characteristics of the channel can change in the interim. Assuming a change in channel fading characteristics, this technique simulates the use of two independently fading channels, and a diversity benefit may therefore be provided.

Unfortunately, in order be reasonably certain of a change in fading characteristics between transmissions, a significant inter-transmission delay is required. This in turn delays the ultimate determination of the transmitted information by the mobile unit.

SUMMARY OF THE INVENTION

The present invention provides an antenna diversity benefit to a mobile receiver by taking advantage of multiple transmitting antennas at a base station. By so doing, the present invention requires only one antenna at the receiver. The invention exploits redundancy introduced by a channel code to provide the diversity benefit. The maximum diversity benefit is upper-bounded by the number of antenna elements in use at the base station, and is equal to the minimum Hamming distance of the channel code used. The present invention is applicable to both FDD- and TDD-based systems.

Illustrative embodiments of the present invention comprise a base station which employs a channel code of length $N \geq 2$ symbols (where N is the number of antennas used by the transmitter to broadcast information), and a minimum Hamming distance $2 \leq d_{min} \leq N$. This channel code is used to encode a group of K information bits. The N antennas of the base station transmitter are separated by a few wavelengths, as is conventional to provide diversity reception with the N antennas. A channel code symbol $c_i$ is transmitted with the $i^{th}$ antenna to represent these K bits. At a receiver, a conventional maximum likelihood channel code decoder provides a diversity of $d_{min}$.

BRIEF DESCRIPTION OF THE DRAWINGS

FIG. 6 presents a further illustrative receiver according to the present invention.

DETAILED DESCRIPTION

A. Incorporation by Reference

Figure 1:
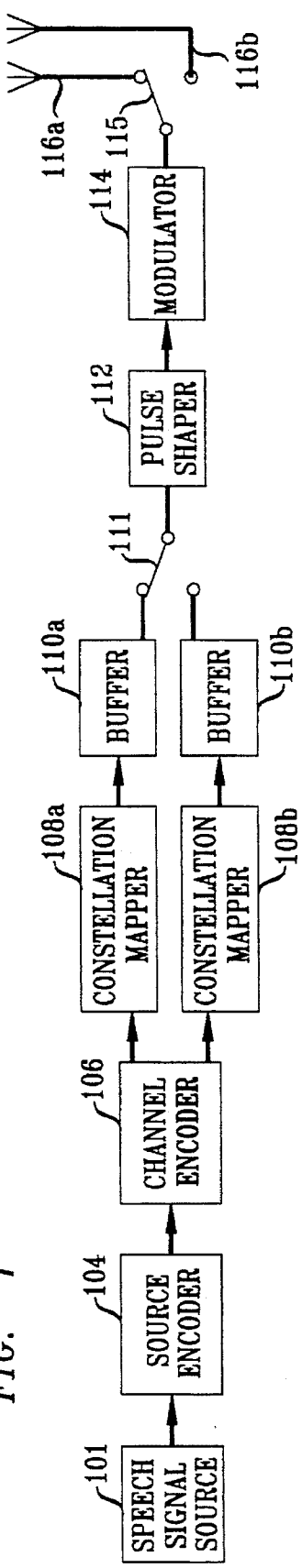
FIG. 1 presents an illustrative embodiment of a transmitter according to the present invention.

Various concepts of digital signal processing referenced herein are well known in, for example, the digital communication art. Thus, they need not be described in detail herein. These concepts include, without limitation, combined modulation and coding, and maximum-likelihood decoding. These concepts are described in U.S. Pat. No.

4,457,004, issued Jun. 26, 1984 to A. Gersho et al.; U.S. Pat. No. 4,489,418, issued Dec. 18, 1984 to J. E. Mazo; U.S. Pat. No. 4,520,490, issued May 28, 1985 to L. Wei; U.S. Pat. No. 4,597,090, issued Jun. 24, 1986 to G. D. Forney, Jr.; U.S. Pat. No. 5,029,185, issued Jul. 2, 1991 to L. Wei; and U.S. patent application Ser. No. 07/797,831, filed Nov. 26, 1991 for Seshadri, et al., commonly assigned herewith—all of which are hereby incorporated by reference as if set forth herein.

B. Illustrative Embodiment Hardware

For clarity of explanation, illustrative embodiments of the present invention are presented as comprising individual functional blocks. The functions these blocks represent may be provided through the use of either shared or dedicated hardware, including, but not limited to, hardware capable of executing software. Illustrative embodiments may comprise digital signal processor (DSP) hardware, such as the AT&T DSP16 or DSP32C, and software performing the operations discussed below. Very large scale integration (VLSI) hardware embodiments of the present invention, as well as hybrid DSP/VLSI embodiments, may also be provided.

C. Introduction to the Illustrative Embodiments

The central idea of conventional antenna diversity reception is that with high probability, a signal received at different antennas undergoes fading at different moments time. Thus, a receiver can combine or select different received signals to reconstruct the transmitted signal with little distortion.

The present invention provides the benefit of diversity by taking advantage of multiple antennas at a transmitter. In order to provide different copies of the transmitted signal to a receiver, an embodiment of the present invention may transmit the same signal at two different non-overlapping intervals of time using different antennas for the transmissions. The receiver now gets N, e.g., two, different copies of the transmitted signal, where each copy is subject to a fade that is statistically independent from that of the other copies. These copies are then combined using a conventional maximum likelihood decoder to provide the diversity advantage. In this case, this decoding may be provided by conventional techniques used to combine multiple copies of signals received by an N antenna receiver, $N \geq 2$.

One embodiment of the present invention provides a repetition code having a length equal to the number of antenna elements at the transmitter. Because transmission efficiency (in terms of bandwidth and power) goes down by a factor of N, it is advantageous to use, combined modulation and coding techniques. These techniques are well understood in the art and can be directly applied here. See the Wei and Seshadri references cited above.

Prior to proceeding with a description of the illustrative embodiments of the present invention, concepts related to a channel model for the embodiments and embodiment error performance will be presented.

1. A Channel Model

The overall transmission channel in which the illustrative embodiments operate may be viewed as comprising N distinct channels, each illustratively undergoing independent slow (static) Rayleigh fading (it should be understood that the principles of the present invention are applicable to other classes of fading channels as well). The impulse response for the $i^{th}$ channel is given by $$h_i(t) = z_i \delta(t) e^{j\omega_o t}, \quad 1 \leq i \leq N, \tag{1}$$

where $\omega_o$ is the angular carrier frequency and $z_i$ is the static complex fade value whose phase is a random variable that is uniformly distributed over $(-\pi, \pi)$, and whose magnitude is Rayleigh distributed with $$p(|z_i|) = 2|z_i| e^{-z_i^2}, \quad z_i \leq 0. \tag{2}$$

The transmitted signal from the $i^{th}$ antenna of the illustrative embodiment is given by $$\bar{s}_i(t) = Re(s_i(t) e^{j\omega_o t}), \tag{3}$$

where $$s_i(t) = \Sigma_n c_{in} p(t-nT) \tag{4}$$

(it is to be understood that the principles of the present invention are applicable to other modulation schemes). Coefficient $c_{in}$ is the $i^{th}$ complex (M-ary data) symbol in a codeword $c_n$, which is generated by encoding the $n^{th}$ group of K information bits into N channel symbols using a channel code with a minimum Hamming distance $2 \leq d_{min} \leq N$, $$c_n = (c_{1n}, c_{2n}, \ldots, c_{nN}). \tag{5}$$

Function p(t) is a pulse shape which is typically a square root Raised cosine Nyquist pulse with an excess bandwidth of 20 to 40% (35% in IS-54, a narrow band TDMA North American digital cellular standard).

The signal received at the mobile unit corresponds to the $i^{th}$ transmitted signal is $$r_i(t) = Re(s_i(t) * h_i(t) + Re[n_i(t) e^{j\omega_o t}], \tag{6}$$

where * denotes the convolution operator and $n_i(t) e^{j\omega_o t}$ is additive co-channel interference (modeled as white Gaussian noise) plus any other source of noise which is also modeled as white Gaussian.

It is advantageous to separate the transmission of symbols (from different antennas) in time so as to avoid interference. It is preferred that the separation be such so that interference is minimized and that a diversity benefit equal to the minimum Hamming distance is obtained. For example, this separation may be equal to one symbol interval with Nyquist pulse-shape transmission. In general, an optimal time separation (or phase relationship) may be obtained according to the following:

$$\int s_i(t) s_j(t) d(t) = 0, \tag{7}$$

for $i \neq j$ and $1 \leq i, j \leq N$. It is preferred that the optimal phase relationship be employed in the transmission of symbols.

In (6) this separation is implicit; the term $n_i(t) e^{j\omega_o t}$ represents co-channel interference coming from a different transmitter operating at the same frequency, $\omega_o$, and not from a different antenna of the same transmitter (transmitting substantially simultaneously).

Assuming coherent demodulation with carrier and phase recovery, the demodulated signal corresponding to the $i^{th}$ transmitted signal is given by $$r_i(t) = \Sigma |z_i| c_{in} p(t-nT) + n'_i(t), \tag{8}$$

$$1 \leq i \leq N, \quad -\infty < t < \infty,$$

where $n'_i(t)$ is additive interference with the same mean and variance as $n_i(t)$ (it should be understood that the principles of the present invention are applicable to other demodulation techniques as well).

Following coherent demodulation, the receiver comprises a square root Nyquist filter which is matched to the transmit pulse p(t). The outputs corresponding to this filter, sample at time jT (inter-symbol interference free timing instant) is $$r_i(jT) = z_i c_{ij} + w_i. \quad (9)$$

The maximum likelihood decoder for recovering the $j^{th}$ group of information bits forms the decision statistic $$\Lambda(\hat{c}) = \sum_{k=1}^{N} r_k(jT) \hat{c}_{kj} \quad (10)$$

$$= \sum_{k=1}^{N} |z_k| c_{kj} \hat{c}_{kj} + \sum_{k=1}^{N} w_k \hat{c}_{kj}$$

corresponding to (8) where $\hat{c}$ is one of the channel codewords that could have been transmitted. The correlation is performed for every possible codeword.

The codeword $\hat{c}$ with the highest correlation is chosen as the transmitted codeword which in turn yields the decoded $j^{th}$ group of K information bits (it should be understood that other decoding techniques can also be used in place of maximum likelihood decoding).

2. Error Performance

Given maximum likelihood decoding well known in the art, the error performance of an embodiment in the presence of independent Rayleigh fading is:

$$P_e \propto \left( \frac{1}{SNR} \right)^{d_{min}} \times \frac{1}{(\text{minimum Product distance})}, \quad (11)$$

where $d_{min}$ is the minimum Hamming distance of the channel code, $$SNR = \frac{\bar{E}_s}{N_o} \quad (\bar{E}_s$$

is the average energy received per symbol), and $N_o$ is the double-sided additive white Gaussian noise spectral density. The minimum product distance is defined as follows. For every pair of codewords that are at the minimum Hamming distance, the per symbol squared Euclidean distance may be determined whenever symbol i in one of the code words is different from symbol i of the other codeword. These squared Euclidean distances are multiplied to give the product distance for that pair of codewords. The minimum of all the product distances is then the minimum product distance.

D. An Illustrative Embodiment

FIG. 1 presents an illustrative embodiment of a digital radio communication system transmitter according to the present invention. The transmitter receives an analog speech signal from speech signal source 101, and processes this signal for transmission on antennas 116a,b. The transmitter comprises a source encoder 104, a channel encoder 106, constellation mappers 108a,b, temporary storage buffers 110a,b, switch 111, pulse shaper 112, modulator 114 and switch 115. Power amplification associated with the transmission of radio signals has been omitted from FIG. 1 for clarity.

The speech signal source 101 provides an analog speech signal to be encoded and transmitted to a mobile receiver. This speech signal is converted to a digital signal by conventional analog-to-digital conversion by source encoder 104. Source encoder 104 provides a digital signal representative of the analog speech signal as output to channel encoder 106. Source encoder 104 may be realized with any of the conventional speech coders.

The channel encoder 106 receives the PCM digital signal comprising a plurality of bits from the source encoder 104. Channel encoder 106 codes the PCM digital signal using a conventional channel code. Any channel code may be employed for this purpose, as long as the number of symbols in each channel code word equals the number of antennas, N, used to transmit the codewords, and the minimum Hamming distance of the code, $d_{min}$, satisfies the relationship $2 \leq d_{min} \leq N$.

The code constructed for the illustrative embodiment of the present invention assumes that the number of antennas at the base station is equal to two. The following illustrative code of length N=2 complex symbols (2 symbols×2 components (in-phase and quadrature) per symbol equals 4 dimensions (4-D)), has a minimum Hamming distance $d_{min}= 2$:

| | Channel Code | |
|---|---|---|
| Information Bits | Symbol 1 | Symbol 2 |
| 00 | 0 | 0 |
| 01 | 1 | 1 |
| 11 | 2 | 2 |
| 10 | 3 | 3 |

The minimum product distance for this code is four.

Figure 2:
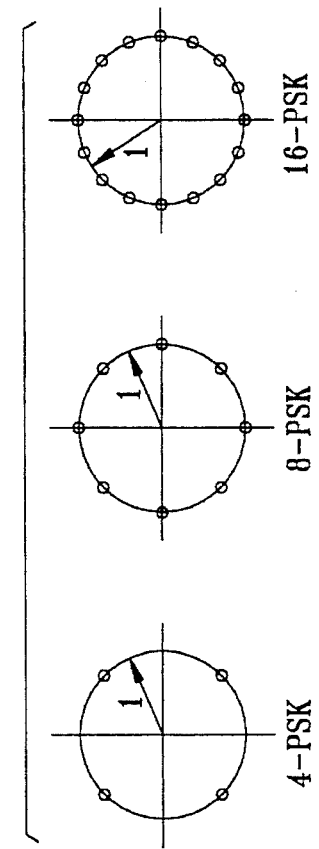
FIG. 2(a)–(c) present illustrative channel code constellations for use with an illustrative channel coder presented in FIG. 1.

Using this code, encoder 106 codes two information bits at a time to generate one of four code words. Each generated codeword comprises two symbols (see columns labeled Symbol 1 and Symbol 2, above). Each symbol belongs to the 4-PSK constellation presented in FIG. 2(a). Thus, a coding rate of one information bit per code symbol is provided by this code. Symbol 1 is transmitted with antenna 116a and symbol 2 with antenna 116b, as discussed below.

The first symbol of each codeword generated by encoder 106 is provided as input to constellation mapper 108a, and the second symbol of the codeword is provided to mapper 108b.

Constellation mappers 108a,b produce a complex valued output corresponding to a symbol received from encoder 106. The real part of this output determines an in-phase component of a modulated signal transmitted at antennas 116a,b. Similarly, the imaginary pan of the output determines a quadrature component of the modulated signal. The constellation mapper 108a,b are conventional mappers well known in the art. They may be realized as a look-up table or as a straight forward combination of logic elements. Mappers 108a,b operate on the first and second symbol of each received codeword, respectively, and provide complex valued output to buffers 110a and b.

Buffers 110a and b provide temporary storage for the complex values received from mappers 108a,b, and illustratively store 100 of such values. Buffering of complex values is provided to facilitate sharing of pulse shaper 112 and modulator 114.

Depending on the state of switch 111, pulse shaper 112 receives buffered complex values from buffer 110a or 110b, and provides spectral shaping to the signal comprising the complex values. Illustratively, the pulse shaper 112 comprises a square-root raised cosine Nyquist filter, as described above. The spectrally shaped signal is modulated for transmission by modulator 114 and the resulting modulated signal is then transmitted by antenna 116a,b.

Switch 111 operates to select a complex valued signal from either buffer 110a or 110b. Switch 115 operates in synchronism with switch 111 to direct a shaped and modulated signal to either antenna 116a or 116b. In operation, switches 111 and 115 select output from buffer 110a for shaping, modulation, and transmission on antenna 116a. After the contents of buffer 110a have been thus processed in this fashion, switches 111 and 115 change state to select output from buffer 110b for shaping, modulation, and transmission on antenna 116b. This procedure of alternating between buffers continues for as long as source 101 produces output for coding.

E. A Second Illustrative Embodiment

Figure 3:
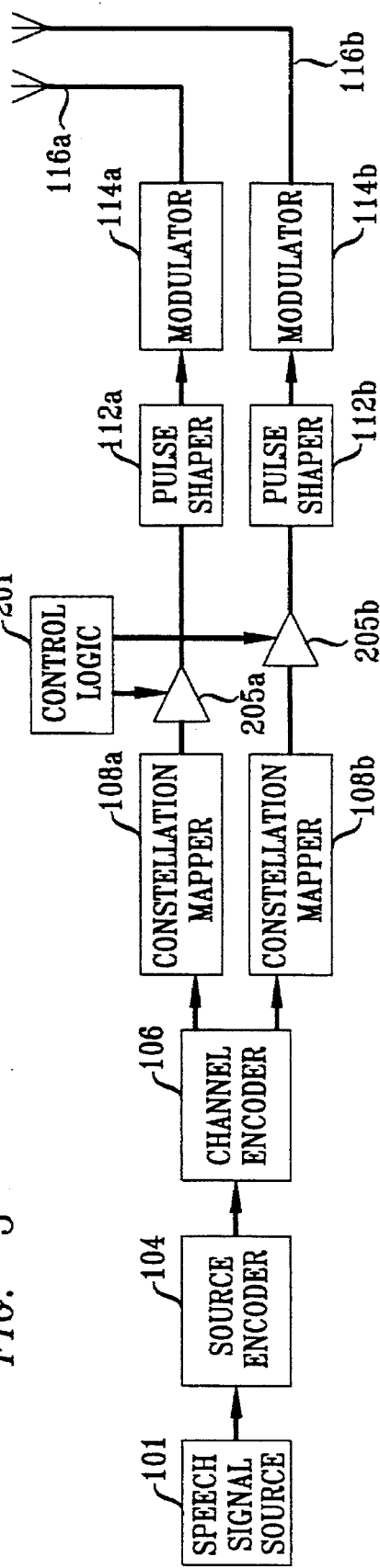
FIG. 3 presents an alternative illustrative embodiment of an encoder according to the present invention.

An alternative embodiment to that presented in FIG. 1 is presented in FIG. 3. This embodiment is similar to that discussed above, but includes dual pulse shapers and modulators. The control logic 201 and amplifiers 205a,b operate in place of the switches 111 and 115, to ensure that the two symbols of a code word are transmitted in successive time intervals using separate antennas, 116a and 116b. This is done by providing one pulse shaper, e.g., 112a, with a complex symbol, while simultaneously providing the other, e.g., 112b, with a zero valued input.

F. Further Illustrative Channel Codes

Either of the embodiments described above may employ other channel codes to enhance coding efficiency. For example, the following code of length 2, $d_{min}=2$, and product distance 2, is formed from an 8-PSK constellation shown in FIG. 2(b). This code has efficiency of 1.5 bits/symbol:

| Information Data | Symbol 1 | Symbol 2 |
| --- | --- | --- |
| 000 | 0 | 0 |
| 001 | 1 | 5 |
| 011 | 2 | 2 |
| 111 | 3 | 7 |
| 100 | 4 | 4 |
| 101 | 5 | 1 |
| 110 | 6 | 6 |
| 111 | 7 | 3 |

A distinct pair of codewords differ in at least two positions. The minimum product distance is 2 because the product of the squared Euclidian distance between, e.g., the symbols 0 and 1 and the symbols 0 and 5 equals 2. Three information bits are conveyed over two intervals; hence the rate is 1.5 bits/symbol.

In another example, a coding efficiency of 2.0 bits/symbol is provided. In order to achieve $d_{min}=2$ and stay with the constraint that the block length of the code equal two, it is necessary to have at least 16 codewords. Hence, 16-PSK (see FIG. 2(c)) is the smallest constellation with which a diversity benefit of 2 can be provided. In general, in order to maintain bandwidth efficiency with N antennas and with minimum Hamming distance, $d_{min}=N$, the minimum constellation expansion factor is $2^N$. The 4D-16 PSK code is shown below:

| Information Data | Symbol 1 | Symbol 2 |
| --- | --- | --- |
| 0000 | 0 | 0 |
| 0001 | 2 | 2 |
| 0010 | 4 | 4 |
| 0011 | 6 | 6 |
| 0100 | 8 | 8 |
| 0101 | 10 | 10 |
| 0110 | 12 | 12 |
| 0111 | 14 | 14 |
| 1000 | 1 | 7 |
| 1001 | 3 | 9 |
| 1010 | 5 | 11 |
| 1011 | 7 | 13 |
| 1100 | 9 | 15 |
| 1101 | 11 | 1 |
| 1110 | 13 | 3 |
| 1111 | 15 | 5 |

Some performance enhancement may be obtained by Gray coding the information data so that the 4-D signal points that are separated by a higher product distance are also subjected to a higher number of information bit errors. The minimum product distance is $(0.587)^2$.

G. An Illustrative Decoder

Figure 4:
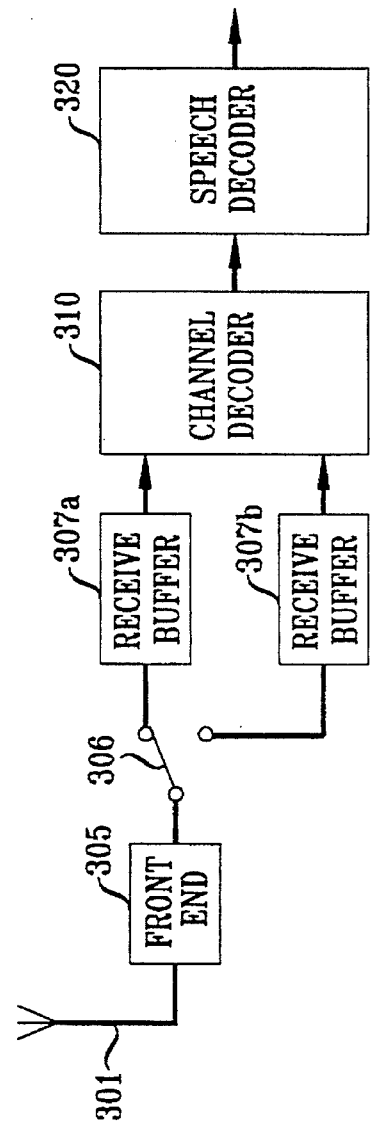
FIG. 4 presents an illustrative embodiment of a receiver according to the present invention.

FIG. 4 presents an illustrative receiver 300 according to the present invention. Receiver 300 receives transmitted signals from antenna 301, and produces analog speech as output. Receiver 300 comprises an RF-to-baseband front end 305, switch 306, receive buffers 307a,b, channel decoder 310, and speech decoder 320.

The RF-to-baseband front end 305 provides conventional demodulated output (i.e., received symbols) to the receive buffers 307a,b via switch 306. Front end 305 includes, e.g., conventional RF to IF conversion, receive filtering, and tinting and carrier recovery circuits.

Receive buffers 307a,b store received symbols from front end 305. Buffers 307a,b are analogous to buffers 110a,b of the illustrative transmitter described in section D and presented in FIG. 1. That is, buffer 307a receives 100 complex symbols corresponding to those previously stored by buffer 110a. These symbols are provided by front end 305 via switch 306. When buffer 301a is full, switch 306 changes state and directs front end output to buffer 307b. Buffer 307b then stores the next 100 symbols provided by the front end 305. Once both buffers 307a,b are filled, the symbols stored therein may be provided to the channel decoder 310, and the process by which the buffers 307a,b were filled may be repeated for the next group of 200 transmitted symbols.

Channel decoder 310 receives the demodulated symbol output from buffers 307a,b, and provides decoded information bits to speech decoder 320. The illustrative decoder 310 operates in accordance with the flow diagram presented in FIG. 5.

Figure 5:
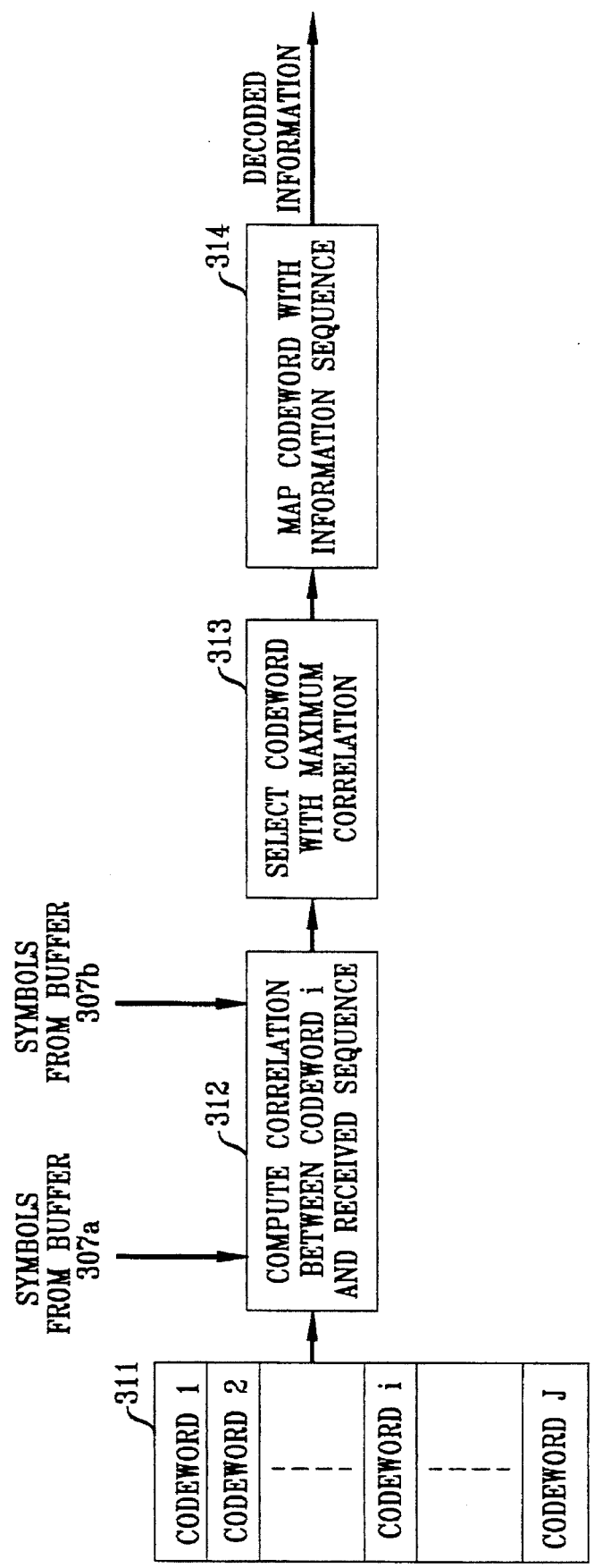
FIG. 5 presents a flow diagram tier an illustrative channel decoder presented in FIG. 4.

As shown in FIG. 5, symbols from receive buffers 307a,b are used in computing correlations with all possible valid codewords stored in memory 311. For example, the first symbol received from buffer 307a taken together with the first symbol received from buffer 307b form a received symbol sequence. This sequence is correlated with each valid codeword to determine which valid codeword most closely matches the received sequence (see 312). The legal codeword having the highest correlation value is the decoded codeword (see 313). The decoded codeword is then mapped to a string of bits which comprises the decoded information (see 314). This process is repeated for each received symbol sequence available from the contents of buffers 307a,b. Resulting is a buffer of decoded information bits which may be supplied to speech decoder 320 to yield an analog speech signal.

Speech decoder 320 is a conventional device providing a mapping of digital speech information to analog speech. Decoder 320 provides an inverse operation to source encoder 104 discussed above with reference to FIG. 1.

In light of the discussion above, it is to be understood that the diversity benefit of the present invention using one receiver antenna may be enhanced by use of multiple receiver antennas. This advantage may be realized by combination of a front end and pair of receive buffers per receiver antenna.

FIG. 6 presents an illustrative decoder in accordance with this enhancement for two receiving antennas 301a,b. As shown in the Figure, received symbols from the first and second buffers associated with each antenna are independently summed (307a and 307c; 307b and 307d). The resultant summed values are provided to the channel decoder 310 for processing as described above.

I claim:

1. A method of transmitting a digital signal with use of a plurality of N antennas, where N is an integer, the method comprising the steps of:

according to a channel code, generating a codeword of N symbols to reflect a set of bits of the digital signal, the channel code having a plurality of codewords and a minimum Hamming distance, $d_{min}$, where $2 \leq d_{min} \leq N$, wherein each of one or more of said plurality of codewords comprises at least two different symbols; and transmitting N signals with N different antennas, each signal representing one of the N symbols of a generated codeword.

2. The method of claim 1 wherein the step of transmitting N signals comprises the step of transmitting the N signals with a phase relationship between each distinct pair of symbols so as to provide a diversity benefit.

3. The method of claim 2 wherein the diversity benefit provided is $d_{min}$.

4. The method of claim 1 wherein the step of transmitting N signals comprises the step of forming in-phase and quadrature amplitude values based on a symbol.

5. The method of claim 4 wherein a transmitted signal is based on in-phase and quadrature amplitude values.

6. An apparatus for transmitting a digital signal with use of a plurality of N antennas, where N is an integer, the apparatus comprising:

a channel encoder for generating a codeword of N symbols according to a channel code, the codeword reflecting a set of bits of the digital signal, the channel code having a plurality of codewords and a minimum Hamming distance, $d_{min}$, where $2 \leq d_{min} \leq N$, and wherein each of one or more of said plurality of codewords comprises at least two different symbols; and means for transmitting N signals with N different antennas, each signal representing one of the N symbols of a generated codeword.

7. The apparatus of claim 6 wherein the means for transmitting N signals comprises means for transmitting the N signals with a phase relationship between each distinct pair of signals so as to provide a diversity benefit.

8. The apparatus of claim 7 wherein the diversity benefit provided is $d_{min}$.

9. The apparatus of claim 6 wherein the means for transmitting N signals comprises means for forming in-phase and quadrature amplitude values based on a symbol.

10. The apparatus of claim 9 wherein the means for transmitting further comprises a modulator for generating a modulated signal based on the in-phase and quadrature amplitude values.

11. The apparatus of claim 9 wherein a transmitted signal is based on in-phase and quadrature amplitude values.

12. A method of generating a set of bits of a digital signal, the method comprising the steps of:

receiving a plurality of N signals transmitted from N different antennas, where N is an integer, each signal representing one of N symbols of a codeword, the codeword based on a channel code having a plurality of codewords and a minimum Hamming distance, $d_{min}$, where $2 \leq d_{min} \leq N$, and wherein each of one or more of said plurality of codewords comprises at least two different symbols;

based on the N received signals, forming N symbols of a received codeword sequence;

comparing the received codeword sequence with one or more valid codewords to associate the received sequence with a valid codeword; and generating a set of bits based on the codeword associated with the received sequence.

13. A receiver for use in a communication system, the communication system including a transmitter comprising a plurality of N antennas, where N is an integer, the communication system communicating codewords of N symbols according to a channel code, the receiver comprising:

means for receiving signals transmitted by the N antennas, each signal representing one of N symbols of a codeword, the codeword based on a channel code having a plurality of codewords and a minimum Hamming distance, $d_{min}$, where $2 \leq d_{min} \leq N$, and wherein each of one or more of said plurality of codewords comprises at least two different symbols;

means, coupled to the means for receiving, for isolating a signal transmitted by each antenna;

means, coupled to the means for isolating, for forming a sequence of N received signals based on the N isolated signals;

means, coupled to the means for forming, for comparing the sequence of N received with one or more valid codewords to associate the sequence with a valid codeword; and means, coupled to the means for comparing, for generating a set of bits based on the codeword associated with the received sequence.

* * * * *